US009740354B2

(12) United States Patent
Schwartz (10) Patent No.: US 9,740,354 B2
(45) Date of Patent: Aug. 22, 2017

(54) FLEXIBLE FREQUENCY SHIFTING IN A CAPACITIVE IMAGE SENSOR

(71) Applicant: SYNAPTICS INCORPORATED, San Jose, CA (US)

(72) Inventor: Adam L. Schwartz, Redwood City, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/968,263

(22) Filed: Dec. 14, 2015

(65) Prior Publication Data

US 2017/0168604 A1    Jun. 15, 2017

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ................................. G06F 3/044; G06F 3/0416
See application file for complete search history.

(56) References Cited

U.S. PATENT DOCUMENTS

| 8,519,970 | B2 | 8/2013 | Westhues et al. |
| 8,605,054 | B2 | 12/2013 | Krenik et al. |
| 8,766,931 | B2 | 7/2014 | Westhues et al. |
| 8,937,606 | B2 | 1/2015 | Sobel et al. |
| 9,001,066 | B2 | 4/2015 | Mohindra |
| 9,081,456 | B2 | 7/2015 | Su et al. |
| 2005/0169401 | A1 | 8/2005 | Abraham et al. |
| 2012/0319988 | A1 | 12/2012 | Schwartz |
| 2013/0127779 | A1 | 5/2013 | Lillie et al. |
| 2014/0125361 | A1 | 5/2014 | Tevs |
| 2015/0130756 | A1* | 5/2015 | Chang ................... G06F 3/0416 345/174 |

* cited by examiner

*Primary Examiner* — Charles Hicks
(74) *Attorney, Agent, or Firm* — Patterson + Sheridan, LLP (57) ABSTRACT

An example processing system for a capacitive sensing device includes sensor circuitry coupled to first and second pluralities of sensor electrodes. The sensor circuitry is configured to, in a first sensing operation, drive the first plurality of sensor electrodes at a first sensing frequency and the second plurality of sensor electrodes a second sensing frequency to acquire first changes in capacitance and second changes in capacitance, respectively, wherein the first and second sensing frequencies are substantially orthogonal. The sensor circuitry is configured to, in a second sensing operation, drive the first plurality of sensor electrodes at the first sensing frequency and the second plurality of sensor electrodes a third sensing frequency to acquire third changes in capacitance and fourth changes in capacitance, respectively, wherein the first sensing frequency and the third sensing frequency are substantially orthogonal. The processing system is configured to determine capacitive sensing data from changes in capacitance.

20 Claims, 5 Drawing Sheets

FLEXIBLE FREQUENCY SHIFTING IN A CAPACITIVE IMAGE SENSOR

BACKGROUND

Field of the Disclosure

Embodiments of disclosure generally relate to capacitive sensing and, more particularly, to flexible frequency shifting in a capacitive image sensor.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Techniques for flexible frequency shifting in a capacitive image sensor are described. In an embodiment, a processing system for a capacitive sensing device includes a sensor module having sensor circuitry coupled to a first plurality of sensor electrodes and a second plurality of sensor electrodes. The sensor circuitry is configured to, in a first sensing operation, drive the first plurality of sensor electrodes at a first sensing frequency and the second plurality of sensor electrodes at a second sensing frequency to acquire first changes in capacitance and second changes in capacitance, respectively, wherein the first sensing frequency and the second sensing frequency are substantially orthogonal. The sensor circuitry is configured to, in a second sensing operation, drive the first plurality of sensor electrodes at the first sensing frequency and the second plurality of sensor electrodes a third sensing frequency to acquire third changes in capacitance and fourth changes in capacitance, respectively, wherein the first sensing frequency and the third sensing frequency are substantially orthogonal. The processing system includes a determination module, coupled to the sensor circuitry, configured to determine first capacitive sensing data from the first and second changes in capacitance and second capacitive sensing data from the third and fourth changes in capacitance.

In another embodiment, an input device includes a first plurality of sensor electrodes, a second plurality of sensor electrodes, and a processing system coupled to the first and second pluralities of sensor electrodes. The processing system is configured to, in a first sensing operation, drive the first plurality of sensor electrodes at a first sensing frequency and the second plurality of sensor electrodes a second sensing frequency to acquire first changes in capacitance and second changes in capacitance, respectively, wherein the first sensing frequency and the second sensing frequency are substantially orthogonal. The processing system is configured to, in a second sensing operation, drive the first plurality of sensor electrodes at the first sensing frequency and the second plurality of sensor electrodes a third sensing frequency to acquire third changes in capacitance and fourth changes in capacitance, respectively, wherein the first sensing frequency and the third sensing frequency are substantially orthogonal. The processing system is configured to determine first capacitive sensing data from the first and second changes in capacitance and second capacitive sensing data from the third and fourth changes in capacitance.

In another embodiment, a method of operating a capacitive sensing device having first and second pluralities of sensing electrodes includes driving, in a first sensing operation, the first plurality of sensor electrodes at a first sensing frequency and the second plurality of sensor electrodes a second sensing frequency to acquire first changes in capacitance and second changes in capacitance, respectively, wherein the first sensing frequency and the second sensing frequency are substantially orthogonal. The method further includes determining first capacitive sensing data from the first and second changes in capacitance. The method further includes driving, in a second sensing operation, the first plurality of sensor electrodes at the first sensing frequency and the second plurality of sensor electrodes a third sensing frequency to acquire third changes in capacitance and fourth changes in capacitance, respectively, wherein the first sensing frequency and the third sensing frequency are substantially orthogonal. The method further includes determining second capacitive sensing data from the third and fourth changes in capacitance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Figure 1:
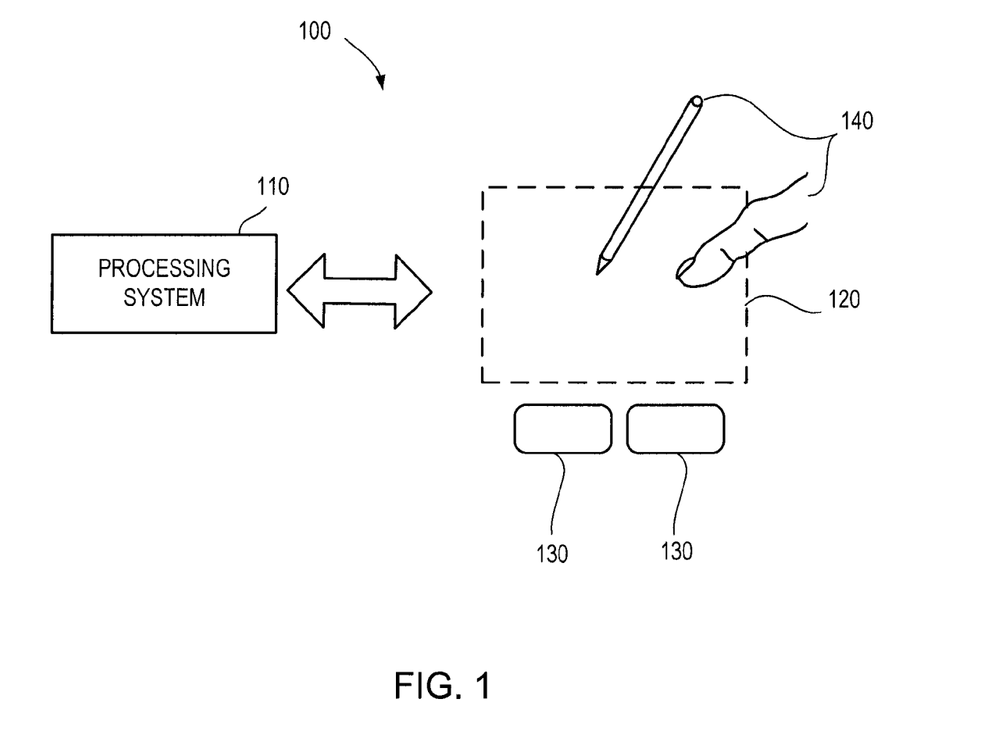
FIG. 1 is a block diagram of an exemplary input device, according to one embodiment described herein.

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 100 is shown as part of the input device 100. The processing system 100 is configured to operate the hardware of the input device 100 to detect input in the sensing region 120. The processing system 100 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 100 also comprises electronically-readable instructions, such as firmware code, software code, and/or the like. In some embodiments, components composing the processing system 100 are located together, such as near sensing element(s) of the input device 100. In other embodiments, components of processing system 100 are physically separate with one or more components close to sensing element(s) of input device 100, and one or more components elsewhere. For example, the input device 100 may be a peripheral coupled to a desktop computer, and the processing system 100 may comprise software configured to run on a central processing unit of the desktop computer and one or more ICs (perhaps with associated firmware) separate from the central processing unit. As another example, the input device 100 may be physically integrated in a phone, and the processing system 100 may comprise circuits and firmware that are part of a main processor of the phone. In some embodiments, the processing system 100 is dedicated to implementing the input device 100. In other embodiments, the processing system 100 also performs other functions, such as operating display screens, driving haptic actuators, etc.

The processing system 100 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 100 responds to user input (or lack of user input) in the sensing region 120 directly by causing one or more actions. Example actions include changing operation modes, as well as GUI actions such as cursor movement, selection, menu navigation, and other functions. In some embodiments, the processing system 100 provides information about the input (or lack of input) to some part of the electronic system (e.g. to a central processing system of the electronic system that is separate from the processing system 110, if such a separate central processing system exists). In some embodiments, some part of the electronic system processes information received from the processing system 100 to act on user input, such as to facilitate a full range of actions, including mode changing actions and GUI actions.

For example, in some embodiments, the processing system 100 operates the sensing element(s) of the input device 100 to produce electrical signals indicative of input (or lack of input) in the sensing region 120. The processing system 100 may perform any appropriate amount of processing on the electrical signals in producing the information provided to the electronic system. For example, the processing system 100 may digitize analog electrical signals obtained from the sensor electrodes. As another example, the processing system 100 may perform filtering or other signal conditioning. As yet another example, the processing system 100 may subtract or otherwise account for a baseline, such that the information reflects a difference between the electrical signals and the baseline. As yet further examples, the processing system 100 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 100 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
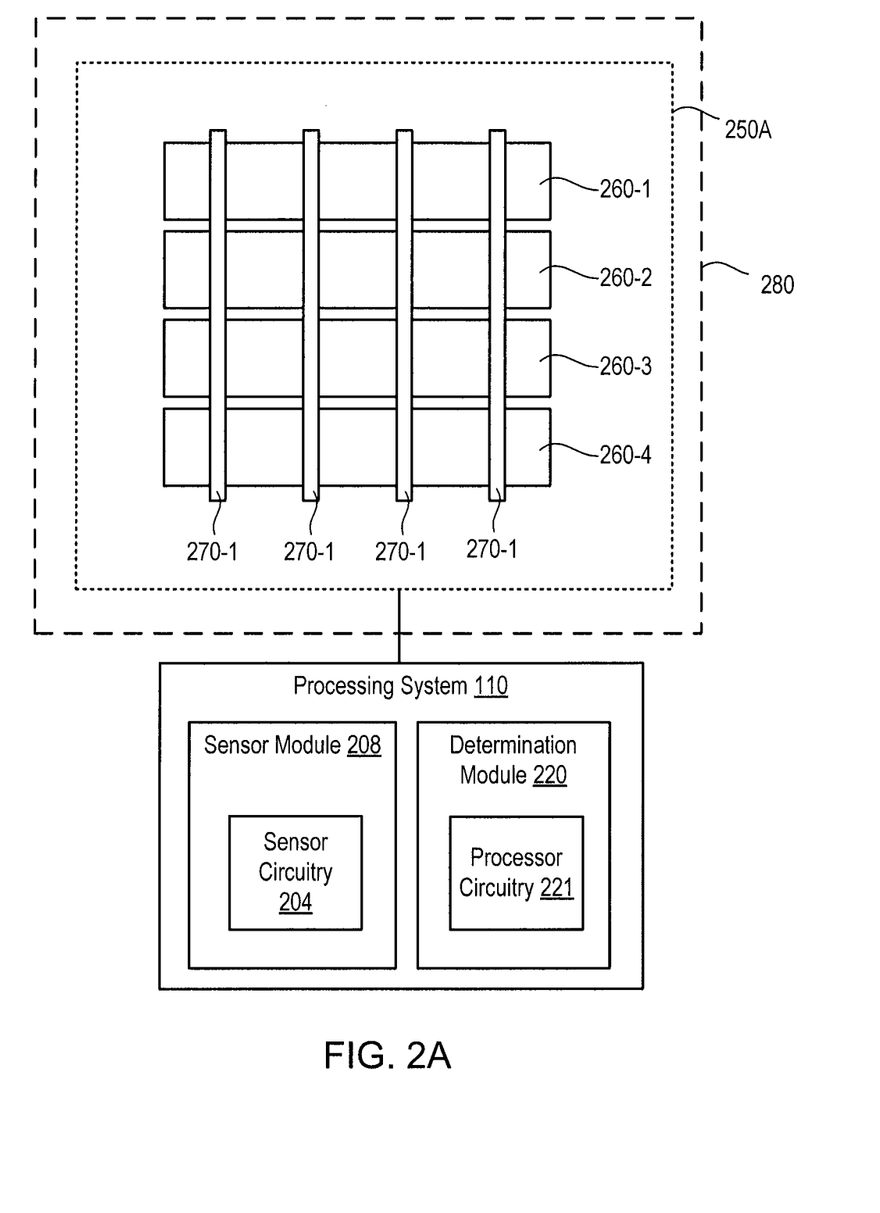
FIGS. 2A-2B illustrate portions of exemplary patterns of sensing elements according to embodiments described herein.

FIG. 2A illustrates a portion of an exemplary pattern of sensing elements according to some embodiments. For clarity of illustration and description, FIG. 2A shows the sensing elements in a pattern of simple rectangles and does not show various components, such as various interconnects between the sensing elements and the processing system 110. An electrode pattern 250A comprises a first plurality of sensor electrodes 260 (260-1, 260-2, 260-3, . . . 260-$n$), and a second plurality of sensor electrodes 270 (270-1, 270-2, 270-3, . . . 270-$m$) disposed over the first plurality of electrodes 260. In the example shown, n=m=4, but in general n and m are each positive integers and not necessarily equal to each other. In various embodiments, the first plurality of sensor electrodes 260 are operated as a plurality of transmitter electrodes (referred to specifically as "transmitter electrodes 260"), and the second plurality of sensor electrodes 270 are operated as a plurality of receiver electrodes (referred to specifically as "receiver electrodes 270"). In another embodiment, one plurality of sensor electrodes may be configured to transmit and receive and the other plurality of sensor electrodes may also be configured to transmit and receive. Further processing system 100 receives resulting signals with one or more sensor electrodes of the first and/or second plurality of sensor electrodes while the one or more sensor electrodes are modulated with absolute capacitive sensing signals. The first plurality of sensor electrodes 260, the second plurality of sensor electrodes 270, or both can be disposed within the sensing region 120. The electrode pattern 250A can be coupled to the processing system 110.

The first plurality of electrodes 260 and the second plurality of electrodes 270 are typically ohmically isolated from each other. That is, one or more insulators separate the first plurality of electrodes 260 and the second plurality of electrodes 270 and prevent them from electrically shorting to each other. In some embodiments, the first plurality of electrodes 260 and the second plurality of electrodes 270 are separated by insulative material disposed between them at cross-over areas; in such constructions, the first plurality of electrodes 260 and/or the second plurality of electrodes 270 can be formed with jumpers connecting different portions of the same electrode. In some embodiments, the first plurality of electrodes 260 and the second plurality of electrodes 270 are separated by one or more layers of insulative material. In such embodiments, the first plurality of electrodes 260 and the second plurality of electrodes 270 can be disposed on separate layers of a common substrate. In some other embodiments, the first plurality of electrodes 260 and the second plurality of electrodes 270 are separated by one or more substrates; for example, the first plurality of electrodes 260 and the second plurality of electrodes 270 can be disposed on opposite sides of the same substrate, or on different substrates that are laminated together. In some embodiments, the first plurality of electrodes 260 and the second plurality of electrodes 270 can be disposed on the same side of a single substrate.

The areas of localized capacitive coupling between the first plurality of sensor electrodes 260 and the second plurality sensor electrodes 270 may be form "capacitive pixels" of a "capacitive image." The capacitive coupling between sensor electrodes of the first and second pluralities 260 and 270 changes with the proximity and motion of input objects in the sensing region 120. Further, in various embodiments, the localized capacitive coupling between each of the first plurality of sensor electrodes 260 and the second plurality of sensor electrodes 270 and an input object may be termed "capacitive pixels" of a "capacitive image." In some embodiments, the localized capacitive coupling between each of the first plurality of sensor electrodes 260 and the second plurality of sensor electrodes 270 and an input object may be termed "capacitive measurements" of "capacitive profiles."

The processing system 100 can include a sensor module 208 having sensor circuitry 204. The sensor module 208 operates the electrode pattern 250A to receive resulting signals from electrodes in the electrode pattern using a capacitive sensing signal having a sensing frequency. The resulting signals measure capacitive couplings (e.g., absolute capacitive couplings between sensor electrodes and an input object or transcapacitive couplings between sensor electrodes). The resulting signals indicate changes in capacitance as a result of input object(s). The sensor circuitry 204 can include various circuits and circuit elements, such as switches, amplifiers, mixers, filters, down-converters, demodulators, analog-to-digital converters, and the like to receive the resulting signals.

The processing system 100 can include a determination module 220 configured to receive resulting signals from the sensor module 208, process the resulting signals, and generate data from the resulting signals, such as determining capacitive sensing data (also referred to as capacitive measurements) from the resulting signals (e.g., a capacitive image or capacitive profile). The determination module 220 can track changes in capacitive sensing to detect input object(s) in the sensing region 120. The determination module 220 can include processor circuitry 221, such as a digital signal processor (DSP), microprocessor, microcontroller, or the like. The processor circuitry 221 can execute firmware and/or software to perform the various functions of the determination module 220 described herein.

The processing system 100 can include other modular configurations, and the functions performed by the sensor module 208 and the determination module 220 can, in general, be performed by one or more modules in the processing system 110. The processing system 100 can include other modules, and can perform other functions as described in some embodiments below.

The processing system 100 can operate in absolute capacitive sensing mode or transcapacitive sensing mode. In absolute capacitive sensing mode, the sensor module 208 provides resulting signals measuring absolute capacitive couplings between sensor electrodes and input object(s) (e.g., changes in absolute capacitance due to input object(s)). In transcapacitive sensing mode, the sensor module 208 provides resulting signals measuring transcapacitive couplings between sensor electrodes (e.g., changes in mutual capacitance between sensor electrodes due to input object(s)).

In some embodiments, the processing system 100 "scans" the electrode pattern 250A to determine capacitive couplings. In the transcapacitive sensing mode, the processing system 100 can drive the first plurality of electrodes 260 to transmit transmitter signal(s). The processing system 100 can operate the first plurality of electrodes 260 such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of electrodes 270 to be independently determined. In the absolute capacitive sensing mode, the processing system 100 can receiving resulting signals from one sensor electrode 260, 270 at a time, or from a plurality of sensor electrodes 260, 270 at a time. In either mode, the processing system 100 can operate the second plurality of electrodes 270 singly or collectively to acquire resulting signals. In absolute capacitive sensing mode, the processing system 100 can concurrently drive all electrodes along one or more axes. In some examples, the processing system 100 can drive electrodes along one axis (e.g., along the first plurality of sensor electrodes 260) while electrodes along another axis are driven with a shield signal, guard signal, or the like. In some examples, some electrodes along one axis and some electrodes along the other axis can be driven concurrently.

In the transcapacitive sensing mode, the processing system 100 can use the resulting signals to determine capacitive measurements at the capacitive pixels. A set of measurements from the capacitive pixels form a "capacitive image" (also "capacitive frame") representative of the capacitive measurements at the pixels. The processing system 100 can acquire multiple capacitive images over multiple time periods, and can determine differences between capacitive images to derive information about input in the sensing region 120. For example, the processing system 100 can use successive capacitive images acquired over successive periods of time to track the motion(s) of one or more input objects entering, exiting, and within the sensing region 120.

In absolute capacitive sensing mode, the processing system 100 can use the resulting signals to determine capacitive measurements along an axis of the sensor electrodes 260 and/or an axis of the sensor electrodes 270. A set of such measurements forms a "capacitive profile" representative of the capacitive measurements along the axis. The processing system 100 can acquire multiple capacitive profiles along one or both of the axes over multiple time periods and can determine differences between capacitive profiles to derive information about input in the sensing region 120. For example, the processing system 100 can use successive capacitive profiles acquired over successive periods of time to track location or proximity of input objects within the sensing region 120. In other embodiments, each sensor can be a capacitive pixel of a capacitive image and the absolute capacitive sensing mode can be used to generate capacitive image(s) in addition to or in place of capacitive profiles.

The baseline capacitance of the input device 100 is the capacitive image or capacitive profile associated with no input object in the sensing region 120. The baseline capacitance changes with the environment and operating conditions, and the processing system 100 can estimate the baseline capacitance in various ways. For example, in some embodiments, the processing system 100 takes "baseline images" or "baseline profiles" when no input object is determined to be in the sensing region 120, and uses those baseline images or baseline profiles as estimates of baseline capacitances. The determination module 220 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In some touch screen embodiments, at least one of the first plurality of sensor electrodes 260 and the second plurality of sensor electrodes 270 comprise one or more display electrodes of a display device 280 used in updating a display of a display screen, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. The display electrodes can also be referred to as "combination electrodes," since the display electrodes perform functions of display updating and capacitive sensing. In various embodiments, each sensor electrode of the first and second plurality of sensor electrodes 260 and 270 comprises one or more combination electrodes. In other embodiments, at least two sensor electrodes of the first plurality of sensor electrodes 260 or at least two sensor electrodes of the second plurality of sensor electrodes 270 may share at least one combination electrode. Furthermore, in one embodiment, both the first plurality of sensor electrodes 260 and the second plurality electrodes 270 are disposed within a display stack on the display screen substrate. Additionally, at least one of the sensor electrodes 260, 270 in the display stack may comprise a combination electrode. However, in other embodiments, only the first plurality of sensor electrodes 260 or the second plurality of sensor electrodes 270 (but not both) are disposed within the display stack, while other sensor electrodes are outside of the display stack (e.g., disposed on an opposite side of a color filter glass).

In an embodiment, the processing system 100 comprises a single integrated controller, such as an application specific integrated circuit (ASIC), having the sensor module 208, the determination module 220, and any other module(s) and/or circuit(s). In another embodiment, the processing system 100 can include a plurality of integrated circuits, where the sensor module 208, the determination module 220, and any other module(s) and/or circuit(s) can be divided among the integrated circuits. For example, the sensor module 208 can be on one integrated circuit, and the determination module 220 and any other module(s) and/circuit(s) can be one or more other integrated circuits. In some embodiments, a first portion of the sensor module 208 can be on one integrated circuit and a second portion of the sensor module 208 can be on second integrated circuit. In such embodiments, at least one of the first and second integrated circuits comprises at least portions of other modules such as a display driver module and/or a display driver module.

Figure 2B:
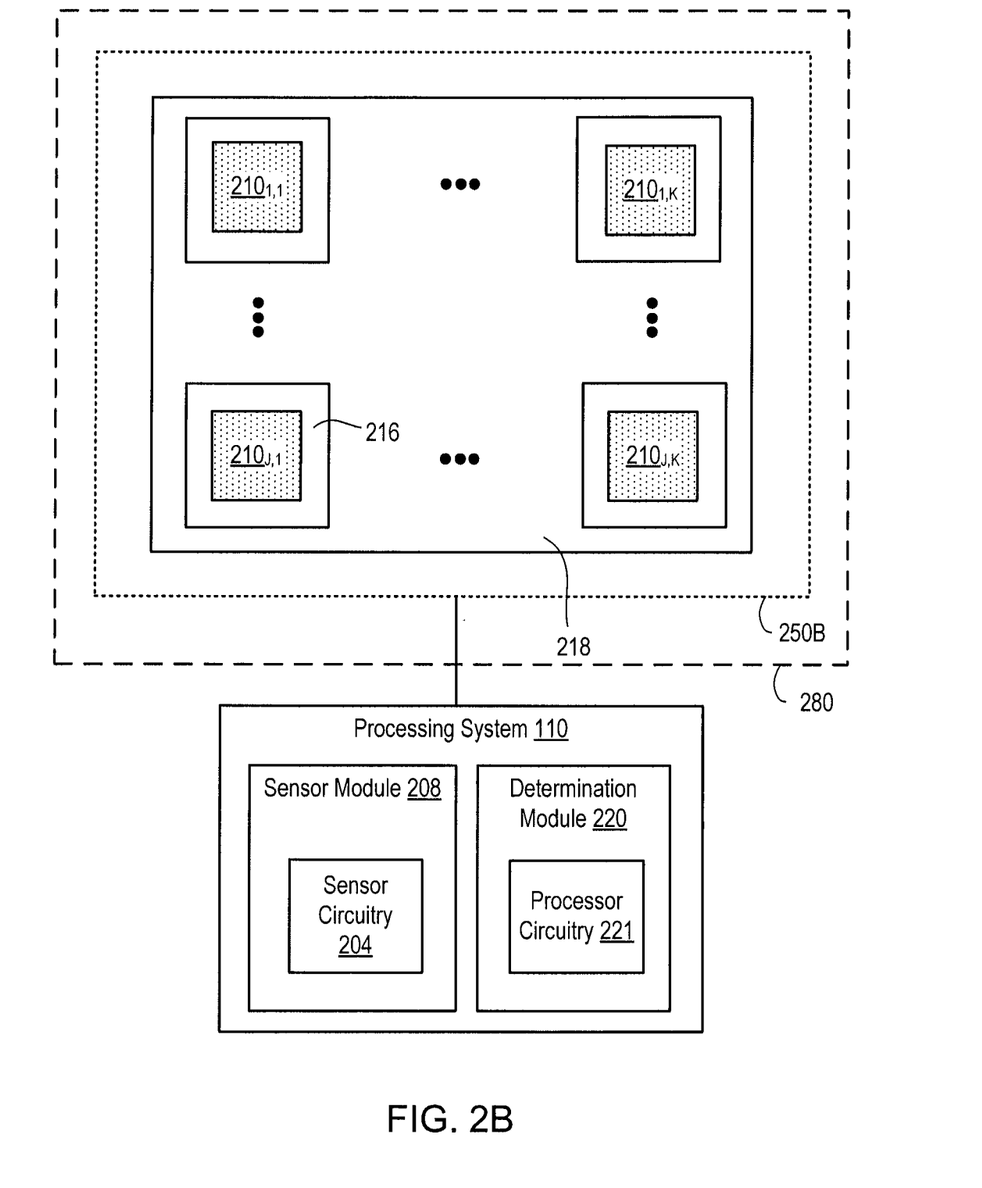

FIG. 2B illustrates a portion of another exemplary pattern of sensing elements according to some embodiments. For clarity of illustration and description, FIG. 2B presents the sensing elements in a matrix of rectangles and does not show various components, such as various interconnects between the processing system 100 and the sensing elements. An electrode pattern 250B comprises a plurality of sensor electrodes 210 disposed in a rectangular matrix. The electrode pattern 250B comprises sensor electrodes $210_{J,K}$ (referred to collectively as sensor electrodes 210) arranged in J rows and K columns, where J and K are positive integers, although one or J and K may be zero. It is contemplated that the electrode pattern 250B may comprise other patterns of the sensor electrodes 210, such as polar arrays, repeating patterns, non-repeating patterns, non-uniform arrays a single row or column, or other suitable arrangement. Further, the sensor electrodes 210 may be any shape, such as circular, rectangular, diamond, star, square, nonconvex, convex, non-concave concave, etc. Further, the sensor electrodes 210 may be sub-divided into a plurality of distinct sub-electrodes. The electrode pattern 250 is coupled to the processing system 100.

The sensor electrodes 210 are typically ohmically isolated from one another. Additionally, where a sensor electrode 210 includes multiple sub-electrodes, the sub-electrodes may be ohmically isolated from each other. Furthermore, in one embodiment, the sensor electrodes 210 may be ohmically isolated from a grid electrode 218 that is between the sensor electrodes 210. In one example, the grid electrode 218 may surround one or more of the sensor electrodes 210, which are disposed in windows 216 of the grid electrode 218. The grid electrode 218 may be used as a shield or to carry a guarding signal for use when performing capacitive sensing with the sensor electrodes 210. Alternatively or additionally, the grid electrode 218 may be used as sensor electrode when performing capacitive sensing. Furthermore, the grid electrode 218 may be co-planar with the sensor electrodes 210, but this is not a requirement. For instance, the grid electrode 218 may be located on a different substrate or on a different side of the same substrate as the sensor electrodes 210. The grid electrode 218 is optional and in some embodiments, the grid electrode 218 is not present.

In a first mode of operation, the processing system 100 can use at least one sensor electrode 210 to detect the presence of an input object via absolute capacitive sensing. The sensor module 208 can measure voltage, charge, or current on sensor electrode(s) 210 to obtain resulting signals indicative of a capacitance between the sensor electrode(s) 210 and an input object. The determination module 220 uses the resulting signals to determine absolute capacitive measurements. When the electrode pattern 250B, the absolute capacitive measurements can be used to form capacitive images.

In a second mode of operation, the processing system 100 can use groups of the sensor electrodes 210 to detect presence of an input object via transcapacitive sensing. The sensor module 208 can drive at least one of the sensor electrodes 210 with a transmitter signal, and can receive a resulting signal from at least one other of the sensor electrodes 210. The determination module 220 uses the resulting signals to determine transcapacitive measurements and form capacitive images.

The input device 100 may be configured to operate in any one of the modes described above. The input device 100 may also be configured to switch between any two or more of the modes described above. The processing system 100 can be configured as described above with respect to FIG. 2A.

In some embodiments, the processing system 100 performs transcapacitive sensing by concurrently driving multiple transmitter electrodes with substantially orthogonal transmitter signals. For example, the processing system 100 can drive a first set of one or more transmitter electrodes with a first transmitter signal concurrently with driving a second set of one or more transmitter electrodes with a second transmitter signal. The first and second transmitter signals can be substantially orthogonal in terms of frequency (e.g., orthogonal frequency division multiplexing (OFDM)), code division multiplexing (CDM), or other modulation techniques that result in signals which are mathematically separable. The term "sensing frequency" as applied to an unmodulated transmitter signal means the frequency of the transmitted signal. For OFDM, sensing frequency of a transmitter signal means the frequency of the waveform being transmitted (e.g., the frequency of the sine wave, square wave, etc.) For CDM, sensing frequency of a transmitter signal means the frequency of the carrier signal (e.g., sine wave, square wave, etc.) being modulated by the CDM code.

In an embodiment, the processing system 100 is configured to drive the sensor electrode pattern according to an ODFM scheme or a combination of an OFDM scheme and another modulation scheme. The transmitter electrodes of a sensor electrode pattern can be divided into one or more transmitter groups. A transmitter group is a set of transmitters each of which transmits a signal having the same sensing frequency as the other signals transmitted in that group. The sensing frequencies used by the different transmitter groups can be mutually orthogonal. Within a transmitter group, there can be further orthogonal modulation, such as the use of different CDM codes that modulate the transmitter signals, so that the transmitter signals within a transmitter group are mutually orthogonal (the inner product between any two signals within a transmitter group is 0 [orthogonal] or close to zero [substantially-orthogonal]). The same set of CDM codes or a different set of CDM codes can be used in different transmitter groups. Use of orthogonal modulation within a transmitter group allows the resulting signals from the transmitter electrodes in the transmitter group to be separated in the demodulation process. Transmitter signals between transmitter groups are mutually orthogonal as they operate at substantially orthogonal sensing frequencies. So signals resulting from different transmitter groups are separated by demodulating and filtering at the different sensing frequencies and signals resulting from different transmitters within a transmitter group are separated by demodulating (or dispreading) by the CDM codes. It may also be the case that the transmitter signals within a transmitter group are mathematically independent (not proportional to one another). Mathematical independence is a weaker requirement than orthogonality, but is enough to ensure that the signals can be separated by the receiver.

In some embodiments, transmitter electrodes are not exclusive to one transmitter group and transmitter electrodes may be a part of multiple transmitter groups. Further, in some embodiments, multiple transmitter groups may consist of the same set of transmitter electrodes. In some embodiments, a transmitter group may have only one transmitter. In some embodiments, transmitter groups may have different numbers of transmitters and operate different CDM codes.

In an embodiment, the sensor module 208 is configured to concurrently transmit a first transmitter signal having a first sensing frequency on one or more transmitter electrodes (e.g., transmitter electrodes in a first transmitter group) and a second transmitter signal having a second sensing frequency on one or more other transmitter electrodes (e.g., transmitter electrodes in a second transmitter group). In other embodiments, the first transmitter signal having a first sensing frequency and a second transmitter signal having a second sensing frequency may be transmitted non-concurrently. In another embodiment, the sensor module 208 is configured to concurrently transmit any number of transmitter signals each having a different sensing frequency (e.g., there can be any number of transmitter groups). In an embodiment, each transmitter electrode is driven with a single transmitter signal having a given sensing frequency. In another embodiment, each transmitter electrode is driven with a plurality of transmitter signals having different sensing frequencies. A transmitter signal or transmitter carrier signal (in the case that the transmitter signal comprises the additional step of modulating with CDM codes) can include any one of a sinusoidal waveform, a square waveform, a triangular waveform, a sawtooth waveform, or the like.

Two frequencies are orthogonal to each other over a time interval T if there exists integers m and n with m≠n such that $F_1=m/T$ and $F_2=n/T$. The time interval T is the sensing interval, which is not necessarily continuous, the integers m and n are the number of complete cycles during the sensing interval T, and the frequencies $F_1$ and $F_2$ are the sensing frequencies. The processing system 100 can employ a set of mutually orthogonal sensing frequencies (e.g., each sensing frequency is substantially orthogonal with each other sensing frequency meaning that there exists integers m and n such that $F_1 \approx F_2$ or that the measurement interval T is close enough to T such that $F_1=F_2$). The processing system 100 can drive one or more transmitter groups with one or more sensing frequencies in the set, respectively. The processing system 100 can shift the sensing frequency of any one transmitter group to another sensing frequency independently of the other transmitter groups.

As discussed below, the processing system 100 can change sensing frequency of one or more transmitter groups in the presence of interference. Interference can affect some sensing frequencies more than other sensing frequencies. If interference is affecting the sensing frequency of one transmitter group, then the processing system 100 can shift the affected sensing frequency to a new sensing frequency independently of the other transmitter groups.

In an embodiment, the processing system 100 can have pre-programmed, can define (e.g., dynamically on demand), or can select, a set of sensing frequencies, S. The set S can be defined as:

$$S = \left\{ \frac{m_1}{T}, \frac{m_2}{T}, \ldots, \frac{m_i}{T} \right\}$$

such that $$\frac{m_1}{T} \perp \frac{m_2}{T} \perp \frac{m_3}{T} \perp \ldots \perp \frac{m_i}{T},$$

where the symbol ⊥ denotes that the frequency on the right hand side is orthogonal to the frequency on the left hand side. For example, suppose T=125 µs. Then, the frequency set S={352 KHz, 288 KHz} for i=2 can be used. These two frequencies correspond to $m_1$=44 and $m_2$=36. In general, the set S can include any number of mutually orthogonal sensing frequencies. In various embodiments, the sensing frequencies in the set S are not required to be exactly orthogonal, but instead can be substantially orthogonal. Substantially orthogonal means that for any two frequencies in $$S\langle s(F_1), s(F_2)\rangle = \int_T s(F_1)(\tau) \cdot s(F_2)(\tau) d\tau \approx 0.$$

In another embodiment, the processing system 100 can employ multiple sets of sensing frequencies. The sensing frequencies within each set are mutually orthogonal. The sensing frequencies within each set are orthogonal with at least one sensing frequency in each of the other sets. Each transmitter group can use one set of the sensing frequencies. For example, a transmitter group A can use a set of sensing frequencies $S_A$, and a transmitter group B can use a set of sensing frequencies $S_B$. If the sensing frequencies in the set $S_A$ are mutually orthogonal with the sensing frequencies in the set $S_B$, then the sets $S_A$ and $S_B$ are subsets of the set S discussed above.

The presence of interference coupled to the sensor electrodes can affect resulting signal measurements, causing reduction in sensing accuracy and even errors. The processing circuit 221 can detect interference from measurements generated by the sensor circuitry 204. The processing circuit 221 can enable or disable interference mitigation at least in part on the interference measurements. Interference mitigation can include switching the sensing frequency of one or more transmitter groups on-demand, as discussed above.

The processing circuit 221 can control the sensor circuitry 204 to measure the interference environment either concurrently with input object sensing or separately during pre-defined interference measurement periods.

In some embodiments, the sensor module 208 drive first and second transmitter signals at a first and second sensing frequency, respectively. In order to utilize OFDM, the first and second sensing frequencies are mutually orthogonal. The determination module 220 is configured to determine whether interference exceeding a threshold is present at either of the first sensing frequency and the second sensing frequency. If interference is present at both sensing frequencies, then the sensor module 208 may adjust both the first and second transmitter signals to operate at a third and a fourth sensing frequency, which are also orthogonal to each other. However, if interference exceeds the threshold on only one of the sensing frequencies, only one of the transmitter signal sensing frequencies needs to change. For example, if interference at the second sensing frequency exceeds the threshold, the sensor module 208 may continue to drive the first transmitter signal at the first sensing frequency while beginning to drive the second transmitter signal at a third sensing frequency, where the first and third sensing frequencies are substantially orthogonal. Thus, in this example the processing system 100 is able to avoid interference on a single sensing frequency without having to switch both sensing frequencies. By having the flexibility to mix and match orthogonal frequencies independently across transmitter groups and not only use specific predefined frequency pairs, the processing system 100 also has more combinations of orthogonal frequencies available to it in order to avoid interference.

Figure 3:
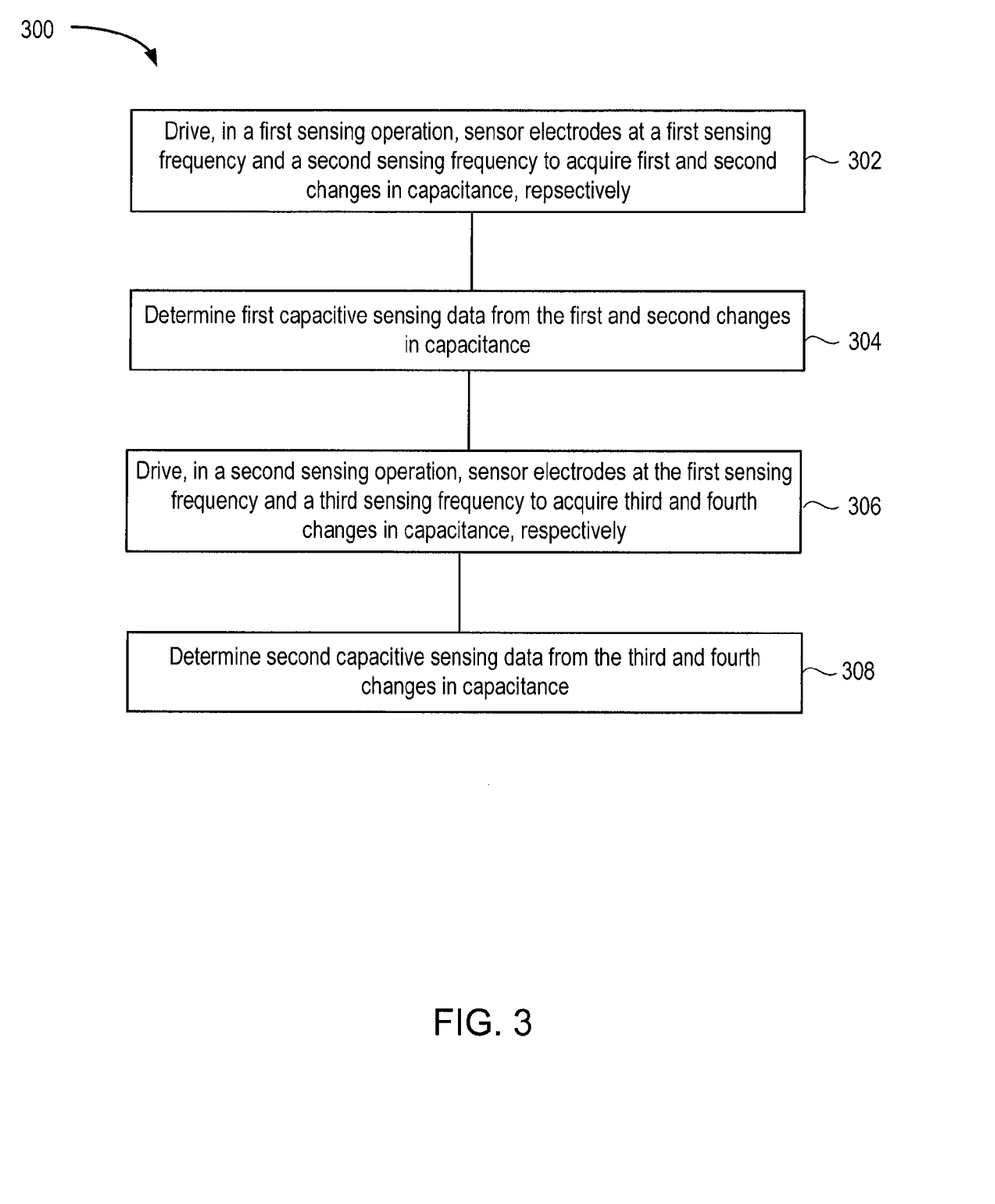
FIG. 3 is a flow diagram depicting a method of operating a capacitive sensing device according to an embodiment.

FIG. 3 is a flow diagram depicting a method 300 of operating a capacitive sensing device according to an embodiment. The method 300 can be performed by the processing system 100 described above. The method 300 begins at step 302, where the processing system 100 drives, in a first sensing operation, sensor electrodes at a first sensing frequency and sensor electrodes at a second sensing frequency to acquire first and second changes in capacitance, respectively. For example, the sensor module 208 can drive some transmitter electrodes 260 in a first transmitter group using the first sensing frequency and other transmitter electrodes 260 in a second transmitter group with the second sensing frequency in the first sensing operation. The frequencies can be selected from a set of orthogonal sensing frequencies and thus the first sensing frequency can be substantially orthogonal to the second sensing frequency. For example, the sensing frequencies can be selected from a set $S_A$ as defined above. The sensor module 208 can receive resulting signals from receiver electrodes 270. The sensor module 208 can demodulate the resulting signals to obtain changes in capacitance attributable to each of the sensing frequencies.

At step 304, the processing system 100 determines first capacitive sensing data from the first and second changes in capacitance. Here, the first and second change in capacitance refer to the changes detected in the touch sensing regions covered by the first and second transmitter groups. The first capacitive sensing data can comprise, for example, a capacitive image as described above. For example, the determination module 220 can receive changes in capacitance attributed to each of the sensing frequencies from the sensor module 208. The determination module 220 can determine a capacitive image for the capacitance changes attributable to one or more sensing frequencies. The determination module 220 can also combine capacitance changes for multiple sensing frequencies (e.g., average) and then determine a capacitive image. The determination module 220 can then output the capacitive sensing data having the capacitive image(s) as output.

At step 306, the processing system 100 drives, in a second sensing operation, sensor electrodes at a first sensing frequency and sensor electrodes at a third sensing frequency to acquire third and fourth changes in capacitance, respectively. For example, the sensor module 208 can drive some transmitter electrodes 260 in the first transmitter group using the first sensing frequency and other transmitter electrodes 260 in the second transmitter group with the third sensing frequency in the second sensing operation. The first and third sensing frequencies are substantially orthogonal. The sensor module 208 can receive resulting signals from receiver electrodes 270. The sensor module 208 can demodulate the resulting signals to obtain changes in capacitance attributable to each of the sensing frequencies. In some embodiments, the third sensing frequency is used in response to detecting interference at the second sensing frequency.

At step 308, the processing system 100 determines second capacitive sensing data from the third and fourth changes in capacitance. The second capacitive sensing data can comprise, for example, a capacitive image as described above. For example, the determination module 220 can receive changes in capacitance attributed to each of the sensing frequencies from the sensor module 208. The determination module 220 can determine a capacitive image for the capacitance changes attributable to one or more sensing frequencies. The determination module 220 can also combine capacitance changes for multiple sensing frequencies (e.g., average) and then determine a capacitive image. The determination module 220 can then output the capacitive sensing data having the capacitive image(s) as output.

The method 300 can be extended for one or more additional sensing operations. In addition, the processing system 100 can drive more than two transmitter groups with more than two mutually orthogonal sensing frequencies. In each sensing operation, the processing system 100 selects orthogonal sensing frequencies be concurrently driven on groups of sensor electrodes.

Figure 4:
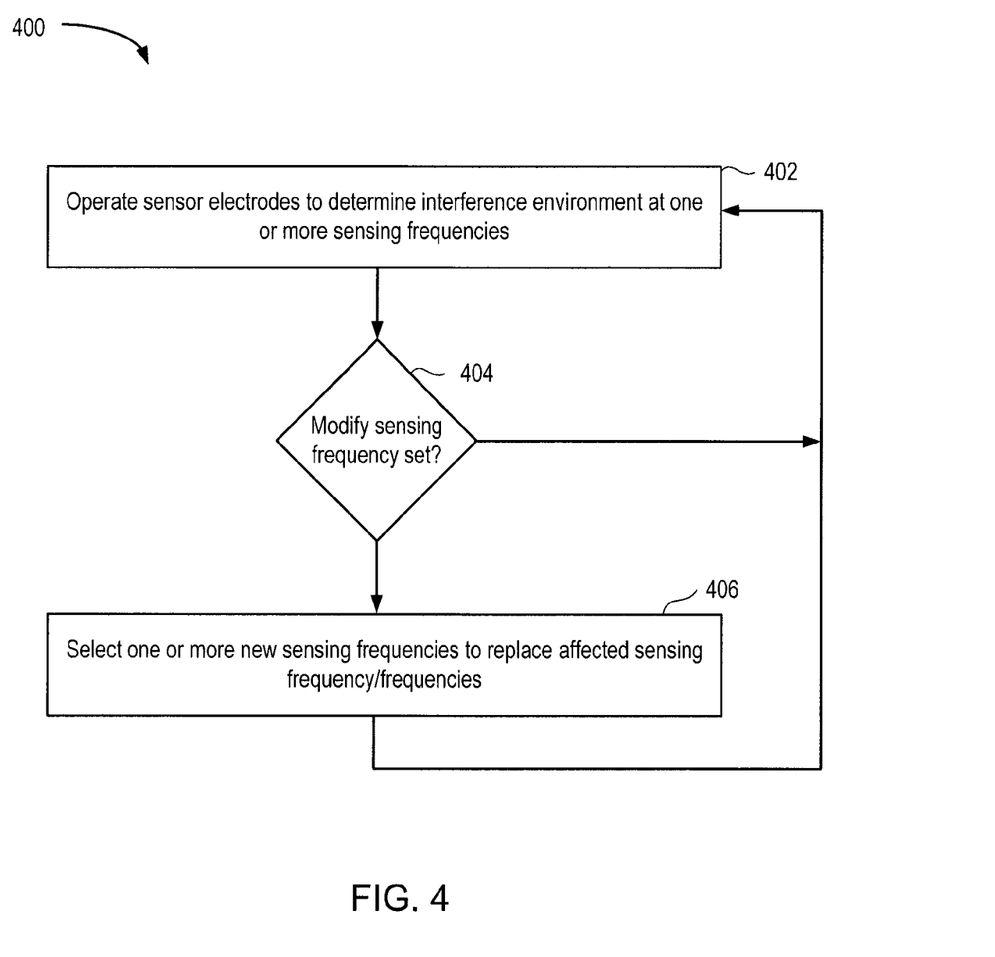
FIG. 4 is a flow diagram depicting another method of operating a capacitive sensing device according to an embodiment.

FIG. 4 is a flow diagram depicting a method of operating a capacitive sensing device according to an embodiment. The method 400 can be performed by the processing system 100 described above. The method 400 begins at step 402, where the processing system 100 operates the sensor electrodes to determine an interference environment at one or more sensing frequencies. In an embodiment, the processing system 100 can perform a separate interference detection process from the capacitive sensing process. In another embodiment, the processing system 100 can detect interference concurrently with capacitive sensing. An interference environment can include various interference metrics associated with resulting signals obtained by the sensor module 208. The determination module 220 can apply one or more thresholds to one or more interference metrics to determine an interference environment.

At step 404, the processing system 100 determines whether the current sensing frequency set should be modified in view of the current interference environment(s). If not, the method 400 returns to step 402. Otherwise, the method 400 proceeds to step 406. For example, the determination module 220 may determine that an interference environment for a first sensing frequency satisfies a threshold, but that the interference environment for a second sensing frequency fails to satisfy a threshold. In such case, the method 400 proceeds to step 406.

At step 406, the processing system 100 selects one or more new sensing frequencies to replace the affected sensing frequency/frequencies. For example, the determination module 220 can replace a second sensing frequency with a third sensing frequency, as described in method 300 above. The method 400 returns to step 402 and repeats. The method 400 can be performed concurrently with the method 300 described above (e.g., interference detection can occur concurrently with capacitive sensing). Alternatively, the method 400 can be performed separately from the method 300 (e.g., interference detection can occur separately from capacitive sensing).

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. A processing system for a capacitive sensing device, comprising:
   a sensor module having sensor circuitry coupled to a first plurality of sensor electrodes and a second plurality of sensor electrodes, the sensor circuitry configured to:
      in a first sensing operation, drive the first plurality of sensor electrodes at a first sensing frequency and the second plurality of sensor electrodes at a second sensing frequency to acquire first changes in capacitance and second changes in capacitance, respectively, wherein the first sensing frequency and the second sensing frequency are substantially orthogonal; and
      in a second sensing operation, drive the first plurality of sensor electrodes at the first sensing frequency and the second plurality of sensor electrodes at a third sensing frequency to acquire third changes in capacitance and fourth changes in capacitance, respectively, wherein the first sensing frequency and the third sensing frequency are substantially orthogonal; and
   a determination module, coupled to the sensor circuitry, configured to determine first capacitive sensing data from the first and second changes in capacitance and second capacitive sensing data from the third and fourth changes in capacitance.

2. The processing system of claim 1, wherein the first capacitive sensing data and the second capacitive sensing data each comprise a capacitive image.

3. The processing system of claim 1, wherein the sensor circuitry is configured to drive sensor electrodes within each of the first and the second plurality of sensor electrodes using orthogonal modulation.

4. The processing system of claim 3, wherein the sensor circuitry is configured to:
   drive sensor electrodes of the first plurality of sensor electrodes, in each of the first and second sensing operations, using different code division multiplexing (CDM) codes from a first set of CDM codes; and drive sensor electrodes of the second plurality of sensor electrodes, in each of the first and second sensing operations, using different CDM codes from the first set of CDM codes or from a second set of CDM codes.

5. The processing system of claim 1, wherein the sensor circuitry is configured to:
   operate the first plurality of sensor electrodes to determine a first interference environment at the first sensing frequency; and
   operate the second plurality of sensor electrodes to determine a second interference environment at the second sensing frequency.

6. The processing system of claim 5, wherein the sensor circuitry is configured to drive the first plurality of sensor electrodes at the first sensing frequency in the second sensing operation based on the first interference environment satisfying a first interference threshold, and wherein the sensor circuitry is configured to drive the second plurality of sensor electrodes at the third sensing frequency in the second sensing operation based on the second interference environment failing to satisfy a second interference threshold.

7. The processing system of claim 1, wherein the sensor circuitry is configured to acquire the first, second, third, and fourth changes in capacitance by receiving resulting signals from a plurality of receiver electrodes.

8. The processing system of claim 1, wherein the determination module is configured to determine position information of an input object based on at least one of the first capacitive sensing data or the second capacitive sensing data.

9. An input device, comprising:
   a first plurality of sensor electrodes;
   a second plurality of sensor electrodes; and
   a processing system, coupled to the first and the second plurality of sensor electrodes, configured to:
      in a first sensing operation, drive the first plurality of sensor electrodes at a first sensing frequency and the second plurality of sensor electrodes at a second sensing frequency to acquire first changes in capacitance and second changes in capacitance, respectively, wherein the first sensing frequency and the second sensing frequency are substantially orthogonal; and
      in a second sensing operation, drive the first plurality of sensor electrodes at the first sensing frequency and the second plurality of sensor electrodes at a third sensing frequency to acquire third changes in capacitance and fourth changes in capacitance, respectively, wherein the first sensing frequency and the third sensing frequency are substantially orthogonal,
      determine first capacitive sensing data from the first and second changes in capacitance and second capacitive sensing data from the third and fourth changes in capacitance.

10. The input device of claim 9, wherein the first capacitive sensing data and the second capacitive sensing data each comprise a capacitive image.

11. The input device of claim 9, further comprising sensor circuitry configured to drive sensor electrodes within each of the first plurality of sensor electrodes and the second plurality of sensor electrodes using orthogonal modulation.

12. The input device of claim 11, wherein the sensor circuitry is configured to:
   drive sensor electrodes of the first plurality of sensor electrodes, in each of the first and second sensing operations, using different code division multiplexing (CDM) codes from a first set of CDM codes; and
   drive sensor electrodes of the second plurality of sensor electrodes, in each of the first and second sensing operations, using different CDM codes from the first set of CDM codes or from a second set of CDM codes.

13. The input device of claim 9, wherein the processing system is configured to:
   operate the first plurality of sensor electrodes to determine a first interference environment at the first sensing frequency; and
   operate the second plurality of sensor electrodes to determine a second interference environment at the second sensing frequency.

14. The input device of claim 13, wherein the processing system is configured to drive the first plurality of sensor electrodes at the first sensing frequency in the second sensing operation based on the first interference environment satisfying a first interference threshold, and wherein the processing system is configured to drive the second plurality of sensor electrodes at the third sensing frequency in the second sensing operation based on the second interference environment failing to satisfy a second interference threshold.

15. The input device of claim 9, wherein the input device comprises plurality of receive electrodes, and wherein the processing system is configured to acquire the first, second, third, and fourth changes in capacitance by receiving resulting signals from the plurality of receiver electrodes.

16. The input device of claim 9, wherein the processing system is configured to determine position information of an input object based on at least one of the first capacitive sensing data or the second capacitive sensing data.

17. A method of operating a capacitive sensing device having a plurality of sensor electrodes, comprising:
   driving, in a first sensing operation, a first plurality of sensor electrodes at a first sensing frequency and a second plurality of sensor electrodes at a second sensing frequency to acquire first changes in capacitance and second changes in capacitance, respectively, wherein the first sensing frequency and the second sensing frequency are substantially orthogonal;
   determining first capacitive sensing data from the first and second changes in capacitance;
   driving, in a second sensing operation, the first plurality of sensor electrodes at the first sensing frequency and the second plurality of sensor electrodes a third sensing frequency to acquire third changes in capacitance and fourth changes in capacitance, respectively, wherein the first sensing frequency and the third sensing frequency are substantially orthogonal; and
   determining second capacitive sensing data from the third and fourth changes in capacitance.

18. The method of claim 17, further comprising:
   operating the first plurality of sensor electrodes to determine a first interference environment at the first sensing frequency; and
   operating the second plurality of sensor electrodes to determine a second interference environment at the second sensing frequency.

19. The method of claim 18, wherein the first plurality of sensor electrodes is driven at the first sensing frequency in the second sensing operation based on the first interference metric satisfying a first interference metric, and wherein the second plurality of sensor electrodes is drive at the third sensing frequency in the second sensing operation based on the second interference environment failing to satisfy a second interference threshold.

20. The method of claim 17, wherein:
sensor electrodes of the first plurality of sensor electrodes are driven, in each of the first and second sensing operations, using different code division multiplexing (CDM) codes from a first set of CDM codes; and
sensor electrodes of the second plurality of sensor electrodes are driven, in each of the first and second sensing operations, using different CDM codes from the first set of CDM codes or from a second set of CDM codes.

* * * * *